(12) United States Patent
Thielen et al.

(10) Patent No.: US 7,476,708 B2
(45) Date of Patent: Jan. 13, 2009

(54) TIRE WITH A COMPONENT MADE OF A RUBBER COMPOSITION COMPRISED OF A RUBBER HAVING PENDANT HYDROXYL GROUPS AND A NONSULFUR CONTAINING SILANE

(75) Inventors: Georges Marcel Victor Thielen, Schouweiler (LU); Frank Schmitz, Bissen (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 125 days.

(21) Appl. No.: 11/643,148

(22) Filed: Dec. 21, 2006

(65) Prior Publication Data

US 2008/0153985 A1 Jun. 26, 2008

(51) Int. Cl.
*C08L 83/04* (2006.01)
(52) U.S. Cl. .................. 525/79; 525/101; 525/105; 525/106; 525/474; 525/479; 152/151
(58) Field of Classification Search .............. 525/88, 525/479
See application file for complete search history.

(56) References Cited

U.S. PATENT DOCUMENTS

| | | | |
|---|---|---|---|
| 4,150,014 A | 4/1979 | Edwards et al. | 260/42.32 |
| 4,150,015 A | 4/1979 | Edwards et al. | 260/42.37 |
| 4,152,308 A | 5/1979 | Edwards et al. | 260/23 H |
| 4,357,432 A | 11/1982 | Edwards | 523/351 |
| 5,395,891 A | 3/1995 | Obrecht et al. | 525/194 |
| 5,672,639 A | 9/1997 | Corvasce et al. | 524/52 |
| 5,902,852 A | 5/1999 | Schulz et al. | 524/821 |
| 6,057,397 A | 5/2000 | Takagishi et al. | 524/492 |
| 6,127,488 A | 10/2000 | Obrecht et al. | 525/333.3 |
| 6,133,364 A | 10/2000 | Obrecht et al. | 524/495 |
| 6,156,822 A * | 12/2000 | Materne et al. | 523/212 |
| 6,166,108 A * | 12/2000 | Materne et al. | 523/212 |
| 6,172,138 B1 * | 1/2001 | Materne et al. | 523/212 |
| 6,207,757 B1 | 3/2001 | Obrecht et al. | 525/194 |
| 6,242,534 B1 | 6/2001 | Obrecht et al. | 525/191 |
| 6,372,857 B1 | 4/2002 | Obrecht et al. | 525/332.6 |
| 6,716,925 B2 | 4/2004 | Thielen et al. | 525/218 |
| 7,071,251 B2 * | 7/2006 | Thielen et al. | 524/47 |
| 7,163,975 B2 * | 1/2007 | Zanzig et al. | 524/47 |
| 2003/0092801 A1 * | 5/2003 | Agostini et al. | 524/27 |
| 2004/0225038 A1 * | 11/2004 | Lin et al. | 524/109 |

OTHER PUBLICATIONS

JW TenBrinke et al. "The Influence of Silane Sulfur and Carbon Rank on Processing of a Silica Reinforced Tire Tread Compound" Mar./Apr. 2003, Rubber Chemistry and Technology, Vol. 76, p. 12.*

* cited by examiner

*Primary Examiner*—Randy Gulakowski
*Assistant Examiner*—John J Figueroa
(74) *Attorney, Agent, or Firm*—John D. DeLong

(57) ABSTRACT

A tire with a rubber containing component compound of a copolymer rubber having pendant hydroxyl groups; and a non-sulfur containing silane.

18 Claims, No Drawings

TIRE WITH A COMPONENT MADE OF A RUBBER COMPOSITION COMPRISED OF A RUBBER HAVING PENDANT HYDROXYL GROUPS AND A NONSULFUR CONTAINING SILANE

BACKGROUND OF THE INVENTION

Vehicular tires, particularly pneumatic tires, are sometimes provided with a component such as, for example, a tread which is comprised of a rubber composition which contains two or more rubbers or elastomers.

Elastomer blends which contain, for example, cis 1,4-polybutadiene and styrene/butadiene elastomers are often used for such tire component (e.g. tire tread). Rubber compositions may also contain various amounts of additional diene-based elastomers such as, for example, one or more of cis 1,4-polyisoprene, cis 1,4-polybutadiene, medium vinyl polybutadiene, styrene/butadiene copolymers, isoprene/butadiene copolymers, and minor amounts of 3,4-polyisoprene.

For the above mentioned styrene/butadiene copolymer rubber, both emulsion polymerization prepared and organic solvent polymerization prepared styrene/butadiene copolymer elastomers have been used. Also, historically, emulsion polymerization derived copolymer elastomers comprised of units derived from styrene and 1,3-butadiene together with an additional monomer have been prepared and proposed for use for various products.

U.S. Pat. No. 5,902,852 discloses the modification of an asphalt cement with a rubbery copolymer prepared by emulsion polymerization which is comprised of repeat units derived from conjugated diolefin monomer, such as, for example, cis 1,4-polybutadiene, vinyl aromatic monomer such as styrene and a small amount of hydroxypropyl methacrylate (HPMA).

U.S. Pat. No. 6,057,397 discloses use of a copolymer of cis 1,4-polybutadiene, styrene and, for example hydroxypropyl methacrylate in rubber compositions.

Hydroxy-containing polymers are disclosed in U.S. Pat. Nos. 4,150,014, 4,150,015, 4,152,308 and 4,357,432.

U.S. Pat. No. 6,716,925 discloses use of a hydroxy-containing rubber with a rubber containing a nitrile moiety.

SUMMARY OF THE INVENTION

The present invention relates to a rubber composition which is particularly suited for use in a tire. The composition is characterized by a copolymer having a pendant hydroxyl group, and a non-sulfur containing silane.

DETAILED DESCRIPTION OF THE INVENTION

There is disclosed a tire having a component comprising
(A) a copolymer rubber comprised of repeat units derived from
 (1) 10 to 99 weight percent of a conjugated diene monomer which contains from 4 to 8 carbon atoms;
 (2) 0 to 70 weight percent of a vinyl substituted aromatic monomer; and
 (3) 1 to 20 weight percent of at least one co-monomer selected from the group consisting of the following general formulas I, II, and III:

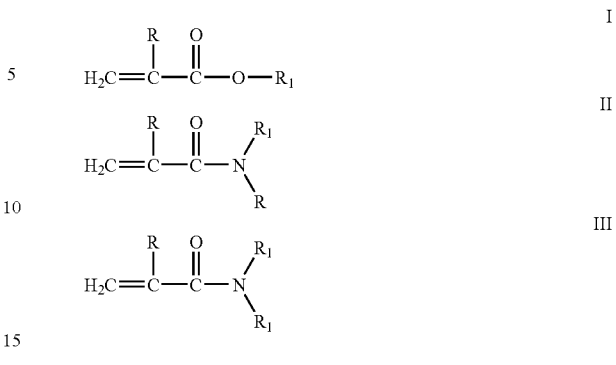

wherein R represents a hydrogen atom or an alkyl group containing from 1 to 8 carbon atoms;
wherein $R_1$ represents a saturated alcohol group containing from 1 to 8 carbon atoms;
(B) 1 to 20 parts by weight, per 100 parts by weight of rubber (phr) of a non-sulfur containing silanes of formula (IV)

$$\text{Alk-Z}_n \qquad \qquad IV$$

in which Z is selected from the group consisting of

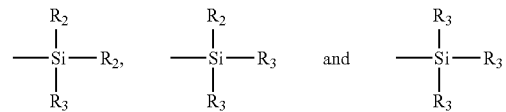

where $R_2$ is an alkyl group of 1 to 4 carbon atoms, cyclohexyl or phenyl; $R_3$ is alkoxy of 1 to 20 carbon atoms, or cycloalkoxy of 5 to 8 carbon atoms; Alk is a divalent hydrocarbon of 1 to 18 carbon atoms and n is an integer of 1 to 2.

In the description of this invention, the terms "rubber" and "elastomer" when used herein, are used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

The term "phr" if used herein, and according to conventional practice, refers to "parts of a respective material per 100 parts by weight of rubber, or elastomer".

The Tg of an elastomer, if referred to herein, refers to a "glass transition temperature" of the elastomer which can conveniently be determined by a differential scanning calorimeter at a heating rate of 10° C. per minute.

The rubber composition includes a copolymer rubber derived from the conjugated diene monomer, optionally a vinyl substituted aromatic monomer, and an hydroxyl containing co-monomer.

Representative examples of conjugated diene monomers which may be used include 1,3-butadiene, isoprene, 1,3-ethylbutadiene, 1,3-pentadiene, 1,3-hexadiene, 1,3-cyclooctadiene, 1,3-octadiene and mixtures thereof. Preferably, the conjugated diene is 1,3-butadiene. The copolymer will contain repeat units derived from 10 to 99 weight percent of the conjugated diene. Alternatively, the copolymer will contain repeat units derived from 30 to 89 weight percent of the conjugated diene. Preferably, from 50 to 80 weight percent of the copolymer will be derived from the conjugated diene.

The copolymer may also be derived from a vinyl substituted aromatic monomer. The vinyl-substituted aromatic compound may contain from 8 to 16 carbon atoms. Representative examples of vinyl substituted aromatic monomers are styrene, alpha methyl styrene, vinyl toluene, 3-methyl styrene, 4-methyl styrene, 4-cyclohexylstyrene, 4-para-tolylstyrene, para-chlorostyrene, 4-tert-butyl styrene, 1-vinylnaphthalene, 2-vinylnaphthalene and mixtures thereof. Preferably, styrene is used. The copolymer will contain repeat units derived from 0 to 70 weight percent of the vinyl substituted aromatic monomer. Alternatively, from 10 to 50 weight percent of the copolymer is derived from a vinyl substituted aromatic monomer. Preferably, from 20 to 40 weight percent of the copolymer is derived from a vinyl substituted aromatic monomer.

The copolymer is also derived from a hydroxyl containing monomer. One to 20 weight percent of the copolymer is derived from the hydroxy containing monomers. Preferably, from 1 to 5 weight percent of the copolymer is derived from these monomers. The hydroxyl containing co-monomer may be a hydroxyl alkyl acrylate of formula I or a hydroxy alkyl acrylamide of formula II and/or III, as seen below.

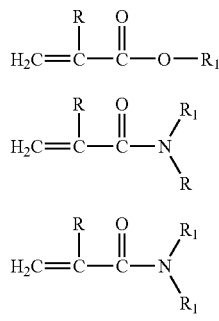

wherein R represents a hydrogen atom or an alkyl group containing from 1 to 8 carbon atoms. Preferably, R is a hydrogen atom or an alkyl group having from 1 to 4 carbon atoms. $R_1$ is a saturated alcohol group containing from 1 to 8 carbon atoms. Preferably, $R_1$ has from 1 to 4 carbon atoms. The saturated alcohol group may be a primary, secondary or tertiary alcohol group.

The hydroxy alkyl acrylate co-monomer of structural formula I may be hydroxymethyl methacrylate, 2-hydroxyethyl methacrylate, 2-hydroxypropyl methacrylate (HPMA isomer), 3-hydroxypropyl methacrylate (HPMA isomer), 3-phenoxy-2-hydroxypropyl methacrylate, hydroxybutyl methacrylate, hydroxyhexyl methacrylate, hydroxyoctyl methacrylate and mixtures thereof. Preferably the hydroxyalkyl acrylate co-monomer of structural formula I is hydroxymethyl methacrylate, 2-hydroxyethyl methacrylate, 2-hydroxypropyl methacrylate, 3-hydroxypropyl methacrylate and mixtures thereof.

When mixtures of such co-monomers are selected, the mixtures may comprise 2-hydroxypropyl methacrylate and 3-hydroxy-propyl methacrylate (HPMA isomers), a blend in weight ratio, for example, in a range of from about 85/15 to about 60/40, respectively.

The hydroxy alkyl acrylamide co-monomer of structural formula II and/or III may be hydroxymethyl methacrylamide, 2-hydroxyethyl methacrylamide, 2-hydroxypropyl methacryloamide and 3-hydroxypropyl methacrylamide, 3-phenoxy-2-hydroxy-2-hydroxypropyl methacrylamide, hydroxybutyl methacrylamide, hydroxyhexyl methacrylamide, hydroxyoctyl methacrylamide and mixtures thereof.

The microstructure, namely the cis and trans structures, of the copolymer are considered herein to be somewhat typical for an emulsion polymerization derived styrene/butadiene copolymer elastomer.

Preferably, the copolymer elastomer is further characterized by a glass transition (Tg) in a range of about 0° C. to about −80° C., with a range of from about −50° C. to about −10° C. being particularly preferred.

The copolymer may have a Mooney viscosity (M/L 1+4 at 100° C.) that varies. Suitable copolymers have a Mooney viscosity as low as 15 to as high as 150. Preferably, the Mooney viscosity ranges from 50 to 120.

The aforesaid copolymer elastomer can be synthesized, for example, by using conventional elastomer emulsion polymerization methods. For example, a charge composition comprised of water, one or more conjugated diolefin monomers, (e.g. 1,3-butadiene), one or more vinyl aromatic monomers (e.g. styrene) and the HPMA, a suitable polymerization initiator and emulsifier (soap). The copolymerization may be conducted over a relatively wide temperature range such as for example, from about 4° C. to as high as 60° C., although a temperature in a range of about 4° C. to about 10° C. may be more desirable.

The emulsifiers may be added at the onset of the polymerization or may be added incrementally, or proportionally as the reaction proceeds. Anionic, cationic or nonionic emulsifiers may be employed.

In addition to the copolymer, the rubber or rubber component may contain one or more additional conjugated diene-based elastomers. When used, the additional rubber or rubbers generally range from 0 to 95 phr of the total rubber used. Preferably, the additional rubber will range from 10 to 90 phr with 90 to 10 phr being the total of the copolymer.

Representative of various additional conjugated diene-based elastomers for use in this invention include, for example, cis 1,4-polyisoprene rubber (natural or synthetic), cis 1,4-polybutadiene, high vinyl polybutadiene having a vinyl 1,2 content in a range of about 30 to about 90 percent, styrene/butadiene copolymers (SBR) including emulsion polymerization prepared SBR and organic solvent polymerization prepared SBR, styrene/isoprene/butadiene copolymers, isoprene/butadiene copolymers and isoprene/styrene copolymers.

Representative of rubber reinforcing carbon blacks for the tire tread rubber composition are those, for example, having an Iodine value (ASTM D1510) in a range of about 80 to about 220, alternatively about 100 to about 150, g/kg together with a DBP (dibutylphthalate) value (ASTM D2414) in a range of about 70 to about 200, alternatively about 100 to about 150 cm³/100 g. Representative of such carbon blacks can easily be found in *The Vanderbilt Rubber Handbook*, 1978 edition, Page 417.

The term "phr" as used herein, and according to conventional practice, refers to "parts by weight of a respective material per 100 parts by weight of rubber, or elastomer."

In addition to the copolymer rubber having pendant hydroxyl groups in the rubberized component of the tire, conventional fillers may be also present. The amount of such conventional fillers may range from 10 to 250 phr. Preferably, the filler is present in an amount ranging from 20 to 100 phr. Included in conventional fillers are silica, carbon black, and particulate fillers including ultra high molecular weight polyethylene (UHMWPE), particulate polymer gels including but not limited to those disclosed in U.S. Pat. No. 6,242,534;

6,207,757; 6,133,364; 6,372,857; 5,395,891; or 6,127,488, and plasticized starch composite filler including but not limited to that disclosed in U.S. Pat. No. 5,672,639.

The commonly employed siliceous pigments which may be used in the rubber compound include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165MP and Z165GR and silicas available from Degussa AG with, for example, designations VN2 and VN3, etc.

Silica may be used in an amount ranging from 20 to 120 phr, preferably in a range of 30 to 100 phr.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm$^3$/100 g.

Carbon black may be used in an amount ranging from 5 to 100 phr, alternatively from 10 to 60 phr.

The rubber composition for use in the tire component also contains a non-sulfur containing organosilicon compound. Examples of suitable non-sulfur containing organosilicon compounds are of the formula:

$$\text{Alk-Z}_n \qquad \qquad \text{IV}$$

in which Z is selected from the group consisting of

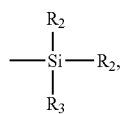 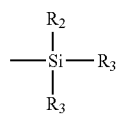 and 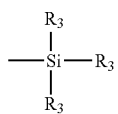

where $R_2$ is an alkyl group of 1 to 4 carbon atoms, cyclohexyl or phenyl; $R_3$ is alkoxy of 1 to 20 carbon atoms, or cycloalkoxy of 5 to 8 carbon atoms; Alk is a divalent hydrocarbon of 1 to 18 carbon atoms and n is an integer of 1 to 2.

The preferred non-sulfur containing organosilicon compounds are the mono- or bis-(trimethoxysilyl)alkanes or mono- or bis-(triethoxysilyl)alkanes. The most preferred compounds is 1,8-bis(triethoxysilyl)octane. Therefore as to formula IV, preferably n is 2 and Z is

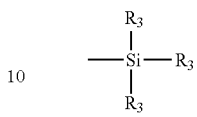

where $R_3$ is an alkoxy of 2 to 4 carbon atoms, with 2 carbon atoms being particularly preferred; and alk is a divalent hydrocarbon of 2 to 12 carbon atoms with 8 carbon atoms being particularly preferred.

In another embodiment, as to formula IV, n is 1 and Z is

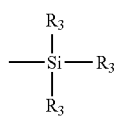

where $R_3$ is an alkoxy of 2 to 4 carbon atoms, with 2 carbon atoms being particularly preferred; and alk is a divalent hydrocarbon of 2 to 18 carbon atoms with 3 to 16 carbon atoms being particularly preferred. In one embodiment, the non-sulfur containing organosilicon compound is propyl triethoxysilane. In another embodiment, the non-sulfur containing organosilicon compound is octyl triethoxysilane.

The amount of the non-sulfur containing organosilicon compound of formula IV in a rubber composition will vary depending on the level of other additives that are used. Generally speaking, the amount of the compound of formula IV will range from 0.5 to 20 phr. Preferably, the amount will range from 1 to 10 phr.

It is readily understood by those having skill in the art that the rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the sulfur vulcanizable and sulfur vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr, with a range of from 1.5 to 6 phr being preferred. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils, and low PCA oils having a polycyclic aromatic (PCA) content of less than 3% by weight (IP346 method), including MES, TDAE, heavy naphthenic, and SRAE oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 3, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can be accomplished by methods known to those having skill in the rubber mixing art. For example the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber composition is mixed in one or more non-productive mix stages. The terms "non-productive" and "productive" mix stages are well known to those having skill in the rubber mixing art. The rubber composition containing the copolymer rubber, as well as the non-sulfur-containing organosilicon compound may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

The rubber composition may be incorporated in a variety of rubber components of the tire. For example, the rubber component may be a tread (including tread cap and tread base), sidewall, apex, chafer, sidewall insert, wirecoat or innerliner. Preferably, the compound is a tread.

The pneumatic tire of the present invention may be a race tire, passenger tire, aircraft tire, agricultural, earthmover, off-the-road, truck tire and the like. Preferably, the tire is a passenger or truck tire. The tire may also be a radial or bias, with a radial being preferred.

Vulcanization of the pneumatic tire of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air. Such tires can be built, shaped, molded and cured by various methods which are known and will be readily apparent to those having skill in such art.

EXAMPLE

Four rubber compounds were prepared to demonstrate the significance of the combination of a copolymer rubber having pendant hydroxyl groups in combination with non-sulfur containing silane. Samples A and B are considered Controls due to the absence of the copolymer rubber having pendant hydroxyl groups or the non-sulfur containing silane. Samples C and D are considered representative of the present invention.

The rubber compositions were prepared in an internal rubber mixer using three separate stages of addition (mixing), namely, two sequential non-productive mix stages (without the sulfur and accelerator curatives) to a temperature of about 160° C. and one final productive mix stage, (with sulfur and accelerator curatives) to a temperature of about 115° C.

Materials used for this Example are illustrated in the following Table 1. The physical properties of the rubber samples are shown in Table 2.

TABLE 1

|  | Control Sample A | Control Sample B | Sample C | Sample D |
|---|---|---|---|---|
| First Non-Productive Mixing |  |  |  |  |
| Emulsion SBR[1] | 75 | 0 | 75 | 0 |
| Emulsion SBR-HPMA[2] | 0 | 75 | 0 | 75 |
| Polybutadiene | 25 | 25 | 25 | 25 |
| Precipitated silica[3] | 75 | 75 | 75 | 75 |
| Coupling agent on carbon black[4] | 12 | 12 | 0 | 0 |
| Coupling agent[5] | 0 | 0 | 6 | 6 |
| Carbon black | 0 | 0 | 6 | 6 |
| Processing oil and Waxes[6] | 21.5 | 21.5 | 21.5 | 21.5 |
| Stearic acid | 3 | 3 | 3 | 3 |
| Antidegradant[7] | 0.75 | 0.75 | 0.75 | 0.75 |
| Second Non-productive Mixing |  |  |  |  |
| Antidegradant[7] | 1.5 | 1.5 | 1.5 | 1.5 |
| Productive Mixing |  |  |  |  |
| Sulfur | 2 | 2 | 2 | 2 |
| Accelerator, sulfenamide and guanidine types | 3.2 | 3.2 | 3.2 | 3.2 |
| Zinc oxide | 2.5 | 2.5 | 2.5 | 2.5 |
| Antidegradant | 1 | 1 | 1 | 1 |

[1]Styrene/butadiene copolymer elastomer, non-oil extended prepared by aqueous emulsion polymerization from The Goodyear Tire & Rubber Company with the following properties: Mooney ML/4 viscosity at 100° C. of about 60; styrene content of about 40 weight percent; glass transition temperature (Tg) of about −33° C. at a DSC (scanning calorimeter) mid-point TABLE 1-continued

| | Control Sample A | Control Sample B | Sample C | Sample D |
|---|---|---|---|---|
| | | | | |

[2]Styrene/butadiene/HPMA copolymer elastomer, non-oil extended, prepared by aqueous emulsion polymerization from The Goodyear Tire & Rubber Company with the following properties: Mooney ML/4 viscosity at 100° C. of about 60; hydroxypropyl methacrylate (HPMA) of about three weight percent; glass transition temperature (Tg) of about −34° C. at a DSC (scanning calorimeter) mid-point. The HPMA was a blend of a 2-hydroxypropyl methacrylate isomers in a weight ratio of about 80/20, respectively, as obtained from the Aldrich Chemical Company.
[3]Obtained as Zeosil 1165 MP from Rhodia S.A.
[4]Composite of bis(3-triethoxysilylproyl) disulfide (obtained as X266S from Degussa S.A.) and carbon black in a 50/50 weight ratio so that the disulfide material is 50 percent of the value reported in Table 1
[5]1,8-bis-(triethoxysilyl) octane
[6]Aromatic rubber processing oil and microcrystalline and paraffinic waxes
[7]Phenylenediamine type

TABLE 2

| | Control Sample A | Control Sample B | Sample C | Sample D |
|---|---|---|---|---|
| Mooney Plasticity (ML/4 100° C.) | 41.5 | 58.5 | 34.4 | 66.5 |
| Non-soluble polymer (percent)[1] | 35.5 | 67.2 | 7.8 | 66.1 |
| Rebound (Zwick) | | | | |
| 0° C. (percent) | 16.8 | 18 | 15.6 | 12 |
| 23° C. (percent) | 33.3 | 31.1 | 27.6 | 32 |
| 100° C. (percent) | 59.6 | 66.1 | 49.6 | 66.8 |
| RPA at 100° C. and 10% strain | | | | |
| Tan delta | 0.138 | 0.105 | 0.212 | 0.096 |
| Rotary Drum Abrasion, loss (mm³) | 111.6 | 96.4 | 195.8 | 95.8 |
| Tear resistance at 100° C. (N/mm) | 19.0 | 17.7 | 26.8 | 16.6 |
| Stress-strain at 23° C. (Zwick Ring assembly) | | | | |
| Tensile strength (MPa) | 18.6 | 20.4 | 12.7 | 19 |
| Elongation at break (%) | 469.3 | 408.6 | 678.5 | 383.1 |
| 100% modulus (MPa) | 2.6 | 2.6 | 1.3 | 2.5 |
| 300% modulus (MPa) | 12 | 15.2 | 3.6 | 15.1 |

[1]Determined by immersing the sample in tetrahydrofurane at 23° C. for 24 hours In this example the hydroxy E-SBR corresponds to HPMA 3% modified ESBR. The ESBR is the non-HPMA control version. The control silane is Si266, a bis(triethoxysilylpropyl)disulfide. The experimental silane is a 1,8-bis-(triethoxysilyl)octane. All properties relevant to rubber hysteresis, reinforcement and abrasion are maintained or improved with the bis (triethoxysilyl)octane in presence of HPMA ESBR, while they drop significantly with unmodified ESBR not able to condense.

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprising
   (A) a copolymer rubber comprised of repeat units derived from
      (1) 10 to 99 weight percent of a conjugated diene monomer which contains from 4 to 8 carbon atoms;
      (2) 0 to 70 weight percent of a vinyl substituted aromatic monomer; and
      (3) 1 to 20 weight percent of at least one co-monomer selected from the group consisting of the following general formulas I, II, and III:

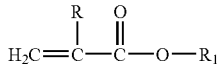

I

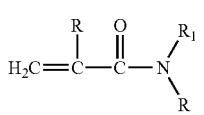

II

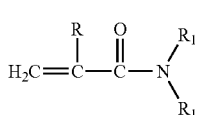

III wherein R represents a hydrogen atom or an alkyl group containing from 1 to 8 carbon atoms;
   wherein R1 represents a saturated alcohol group containing from 1 to 8 carbon atoms; and
   (B) 1 to 20 parts by weight, per 100 parts by weight of rubber (phr) of 1,8-bis-(triethoxysilyl) octane.

2. The rubber composition of claim 1 wherein said co-monomer is of formula I.

3. The rubber composition of claim 1 wherein said conjugated diene monomer is 1,3-butadiene and the vinyl substituted aromatic monomer is styrene.

4. The rubber composition of claim 1 further comprising from 20 to 120 phr of silica.

5. The rubber composition of claim 1 wherein the Tg of the copolymer elastomer ranges from 0° C. to −80° C.

6. The rubber composition of claim 1 wherein R is selected from the group consisting of a hydrogen atom and alkyl groups having from 1 to 4 carbon atoms.

7. The rubber composition of claim 1 wherein $R_1$ is selected from the group consisting of a saturated alcohol group containing from 1 to 4 carbon atoms.

8. The rubber composition of claim 1 wherein said rubber composition comprises at least one additional rubber selected from the group consisting of cis 1,4-polyisoprene rubber, cis 1,4-polybutadiene, high vinyl polybutadiene, styrene/butadiene copolymers, styrene/isoprene/butadiene copolymers, 3,4-polyisoprene, isoprene/butadiene copolymers and isoprene/styrene copolymers.

9. The rubber composition of claim 8 wherein from 10 to 90 phr is said copolymer rubber; and from 10 to 90 phr of at least one additional rubber selected from the group consisting of cis 1,4-polyisoprene rubber, cis 1,4-polybutadiene, high vinyl polybutadiene, styrene/butadiene copolymers, styrene/isoprene/butadiene copolymers, 3,4-polyisoprene, isoprene/butadiene copolymers and isoprene/styrene copolymers.

10. A tire comprising at least one component comprising
   (A) a copolymer rubber comprised of repeat units derived from
      (1) 10 to 99 weight percent of a conjugated diene monomer which contains from 4 to 8 carbon atoms;
      (2) 0 to 70 weight percent of a vinyl substituted aromatic monomer; and
      (3) 1 to 20 weight percent of at least one co-monomer selected from the group consisting of the following general formulas I, II, and III:

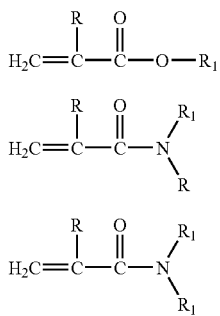

wherein R represents a hydrogen atom or an alkyl group containing from 1 to 8 carbon atoms;

wherein $R_1$ represents a saturated alcohol group containing from 1 to 8 carbon atoms; and (B) 1 to 20 parts by weight, per 100 parts by weight of rubber (phr) of 1,8-bis-(triethoxysilyl) octane.

11. The tire of claim 10 wherein said co-monomer is of formula I.

12. The tire of claim 10 wherein said conjugated diene monomer is 1,3-butadiene and the vinyl substituted aromatic monomer is styrene.

13. The tire of claim 10 wherein the at least one component further comprises from 20 to 120 phr of silica.

14. The tire of claim 10 wherein the Tg of the copolymer elastomer ranges from 0° C. to −80° C.

15. The tire of claim 10 wherein R is selected from the group consisting of a hydrogen atom and alkyl groups having from 1 to 4 carbon atoms.

16. The tire of claim 10 wherein $R_1$ is selected from the group consisting of a saturated alcohol group containing from 1 to 4 carbon atoms.

17. The tire of claim 10 wherein said rubber composition comprises at least one additional rubber selected from the group consisting of cis 1,4-polyisoprene rubber, cis 1,4-polybutadiene, high vinyl polybutadiene, styrene/butadiene copolymers, styrene/isoprene/butadiene copolymers, 3,4-polyisoprene, isoprene/butadiene copolymers and isoprene/styrene copolymers.

18. The tire of claim 17 wherein from 10 to 90 phr is said copolymer rubber; and from 10 to 90 phr of at least one additional rubber selected from the group consisting of cis 1,4-polyisoprene rubber, cis 1,4-polybutadiene, high vinyl polybutadiene, styrene/butadiene copolymers, styrene/isoprene/butadiene copolymers, 3,4-polyisoprene, isoprene/butadiene copolymers and isoprene/styrene copolymers.

* * * * *